March 31, 1959
J. WLEÜGEL
2,880,157
ARRANGEMENT OF THE VERTICAL CONTACT RODS OF SELFBAKING
ANODES IN FURNACE FOR ELECTROLYTIC
RECOVERY OF ALUMINUM
Filed Sept. 13, 1955
2 Sheets-Sheet 1
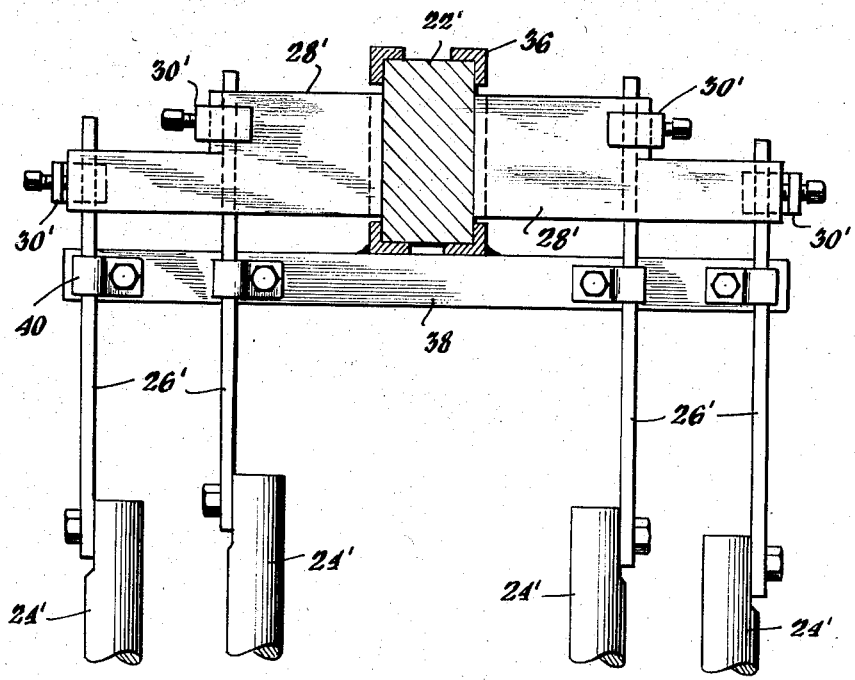
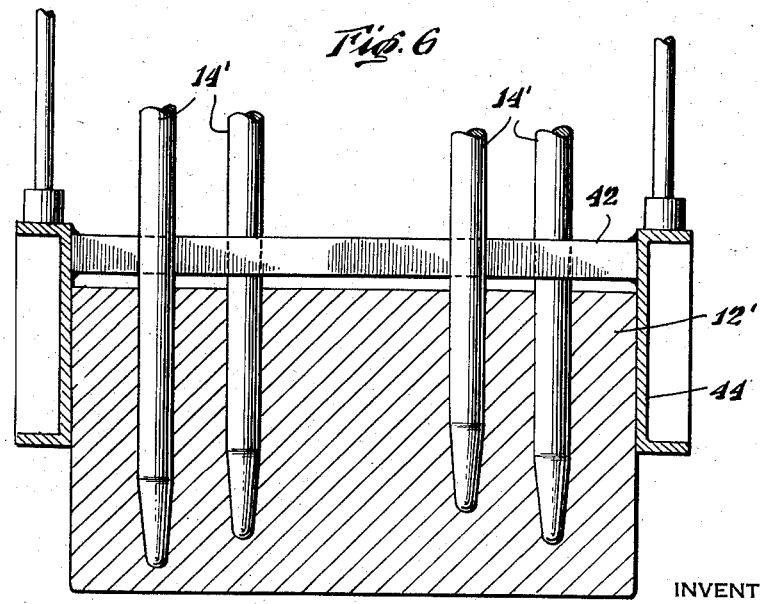
INVENTOR
Johan Wleügel
BY
Eyre, Mann & Burrows
ATTORNEYS

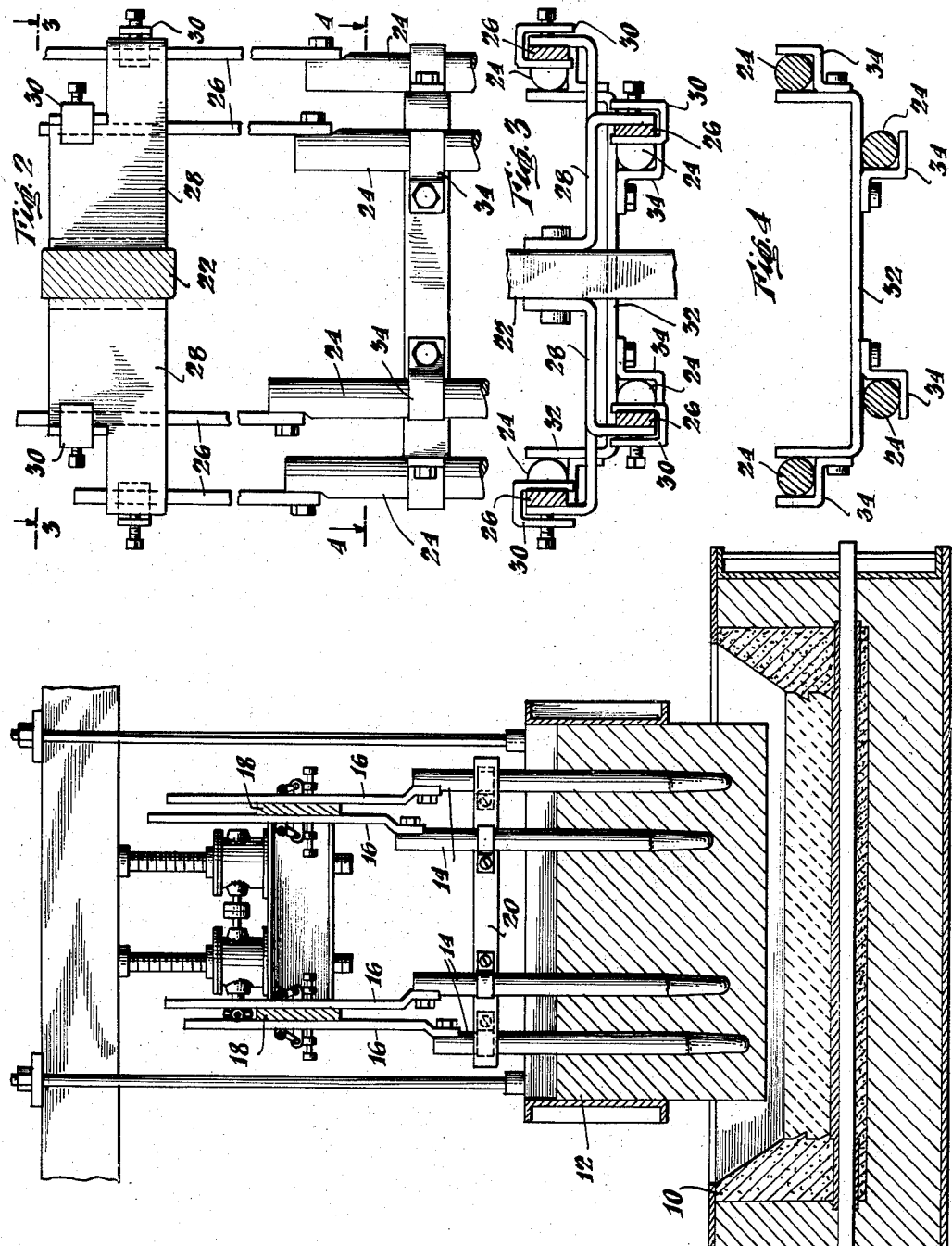

United States Patent Office 2,880,157
Patented Mar. 31, 1959

2,880,157

ARRANGEMENT OF THE VERTICAL CONTACT RODS OF SELFBAKING ANODES IN FURNACE FOR ELECTROLYTIC RECOVERY OF ALUMINUM

Johan Wleügel, Oslo, Norway, assignor to Elektrokemisk A/S, Oslo, Norway, a corporation of Norway Application September 13, 1955, Serial No. 534,103

11 Claims. (Cl. 204—243)

This invention relates to electrodes of the type ordinarily used in electrolytic production of aluminum and in particular to a structure which tends to uniformly distribute magnetic forces in the furnace which may otherwise interfere with the orderly operation of the furnace. The structure of my invention may be used to great advantage with the selfbaking or Soederberg type of electrodes but it is also useful with other types of electrodes such as the prebaked type.

In modern pots for the electrolytic production of aluminum from aluminum oxide it is now customary to use so-called continuous electrodes supported by vertical contact rods. Also according to modern design it has become customary to use pots of large size and high amperage. For example, the amperage may range from 60,000 to 100,000 amperes or even higher. With pots of this size and using a current of this order of magnitude, disturbances in the operation caused by electromagnetic forces can create serious difficulties. There is, for example, a risk that the whole bath may be displaced in one or the other direction.

I have discovered that a great improvement can be had in the distribution of the magnetic forces if magnetic short-circuiting is provided across the furnace in the area between the bus bars and furnace bath. This may conveniently be done by providing substantially horizontal magnetic short-circuiting members that run across from one side of the furnace to the other. The magnetic short-circuiting members can be connected with the vertical contact rods that supply current from the bus bar to the electrode. I have also found it advantageous to form the vertical contact rods out of iron and attach to the top of each contact rod a metal bar which will serve as an electrical conductor for connecting the contact rod with the bus bar and to make such metal conductor bar of a non-magnetic metal such as aluminum or copper. My magnetic short-circuiting members may also be used with advantage to assist in carrying the weight of the electrode mass or alternatively the magnetic short-circuiting members may be used for reinforcing the electrode casing.

My magnetic short-circuiting structure may be used in connection with a single overhead centrally located bus bar construction as shown in United States patent application, Serial No. 372,241, filed August 4, 1953, or the structure may be used in conjunction with a usual type of construction employing two overhead bus bars of the general type shown, for example, in Jouannet Patent No. 2,475,452.

My invention can readily be understood by reference to the accompanying drawings, in which Fig. 1 is a sectional view through an aluminum pot showing the vertical studs magnetically short-circuited;

Fig. 2 is a detailed section of an alternative form of construction showing a single longitudinal bus bar;

Fig. 3 is a vertical section on line 3—3 of Fig. 2;

Fig. 4 is a similar section on line 4—4 of Fig. 2;

Fig. 5 is a structure similar to that of Fig. 2 which illustrates an alternate position for the magnetic short-circuiting members; and Fig. 6 is a structure similar to that of Fig. 1 which illustrates still another alternate position for my magnetic short-circuiting members.

In Fig. 1 the numeral 10 represents the aluminum pot and 12 is the carbon electrode mass which will extend down into the bath contained in the pot 10. This mass is ordinarily rectangular in plan. A series of vertical rods 14 run down into the electrode mass. Connected to the top of each rod 14 is a bar 16 and the bars 16 are clamped to the bus bars 18. The bars 16 may be made of iron like the rods 14 but preferably they are made of a non-magnetic, conductive metal, for example of aluminum or copper. Except for the expense, silver could be used.

In this figure the short-circuiting is accomplished by a series of iron bars 20 which run across the furnace below the bus bars and each bar 20 preferably bears against and may be clamped to a set of four vertical rods 14 that are located in a common transverse zone of the furnace. It is understood that one of these short-circuiting bars 20 will be used for each of the various sets of the vertical rods along the length of the pot.

In the illustrative example shown in this figure the short-circuiting bar is shown as serving no other purpose except to cause the short-circuiting and no particular mechanism is shown whereby this bar would also assist in supporting the weight of the electrode mass.

In Fig. 2 a single bus bar 22 is employed and connected to this are a series of iron rods 24 connected with vertical bars 26 which, as before, are preferably made of a non-magnetic, conductive metal. In this case the side flanges or extensions 28 run out from each side of the bus bar 22 for attaching to the bars 26 by clamp 30.

Here, as before, a short-circuiting member 32 runs across below the bus bar 22 and is shaped so that it can be connected to a set of four rods 24 and attached by clamps 34. Again, no attempt is made to show the short-circuiting mechanism as assisting to support the weight of the electrode mass, though there is nothing to prevent this being done. For example, in Fig. 5, I illustrate one way in which the magnetic short-circuiting members may be arranged to support the weight of the electrode mass. Fig. 5 illustrates a construction identical with that of Fig. 2, with the exception that a portion of the iron framework 36 which supports bus bar 22′ is shown and the short-circuiting members 38 are connected as by welding to iron framework 36. Each of the vertical contact bars 26′ are clamped to short-circuiting members 38 by means of clamps 40. With this construction the short-circuiting members 38 may be used to carry the weight of the electrode mass and if this is done members 28′ and 26′ need only supply electric current to vertical rods 24′ without carrying any substantial part of the weight of the electrode. In Fig. 5 the reference characters 22′, 26′ etc. refer to elements that correspond to elements marked 22, 26, etc. in Fig. 2.

The magnetic short-circuiting members in the structure of my invention may also be used as crosswise reinforcements for the electrode casing. This is illustrated in Fig. 6. Fig. 6 shows an electrode structure which corresponds to that of Fig. 1 and the elements marked 12′, 14′, etc. correspond to elements marked 12, 14, etc. in Fig. 1. In this case the magnetic short-circuiting members 42 are positioned across the top of the electrode casing 44 where they form bridging and reinforcing members which materially strengthen the casing. It is to be noted that the magnetic short-circuiting members 42 are not clamped to vertical rods 14′ and need not even be in contact with the vertical rods since as distinguished from electrical short-circuiting, magnetic short-circuiting is achieved independently of actual contact between the magnetic short-circuiting members and vertical contact rods. Even without clamping, a member 42 may be considered as magnetically coupled to the set of rods 14' in that transverse zone of the furnace through which such particular member 42 runs. It is only necessary to clamp the magnetic short-circuiting members to the vertical members in those cases where the magnetic short-circuiting members are used to support the weight of the electrode mass or in those cases where it is convenient to use clamps for supporting the weight of the magnetic short-circuiting members as in Fig. 1. Otherwise the construction illustrated in Fig. 6 is the same as that shown in Fig. 1. It is important to note that in all the cases illustrated the construction is such that even where the vertical rods and short-circuiting members are clamped together, the connections are so arranged that they can readily be released to permit individual rods to be adjusted vertically. Since, in the operation of electrodes of this type, such individual adjustments must be made frequently, permanent and fixed connections between the vertical rods and the short-circuiting members would be highly disadvantageous.

A carefully studied investigation has shown that this magnetic short-circuiting produces a marked effect on the electro-magnetic forces operating on the bath of the furnace and that where the short-circuiting is done below the bus bar and the magnetic connection between the support rods and the bus bar is broken by using a non-magnetic but conductive metal for connecting the rods to the bus bars, an enormously improved result can be had. Even where the bars connecting the rods to the bus bars are made of iron, a marked improvement is had in electromagnetic forces but the maximum effect is had with the short-circuiting below the bus bar and non-magnetic metal members connecting the iron rods with the bus bars.

What I claim is:

1. In combination, a pot for smelting aluminum, an electrode of the continuous self-baking type adapted to extend down into the pot far enough to enter a bath to be treated in the pot, vertical iron rods extending up out of such electrode whereby the electrode is suspended and current is transmitted to the electrode, a bus bar construction located over the top of the electrode, contact members connecting said rods and the bus bar construction and iron connection members running across above the top of the pot but below the bus bar construction each such connection member being below and spaced from the bus bar construction and magnetically coupled with the members of a set of the vertical iron rods located in a common transverse zone of the furnace so as to magnetically short circuit said set of vertical iron rods, whereby such connection members serve to protect the metallic bath in the pot from magnetic fields generated by the flow of electric current through the bus bar construction.

2. An arrangement as specified in claim 1 in which the contact members between the iron rods and the bus bars are made of non-magnetic but conductive metal.

3. A structure as claimed in claim 1 in which the bus bar construction comprises a single bus bar unit running longitudinally of the electrode, with a plurality of rows of vertical rods on each side of the bus bar, and projections running out laterally from the bus bar construction to contact with the contact members of such vertical rods.

4. In combination, a pot for smelting aluminum adapted to hold a metallic bath, a holder for a continuous self-baking electrode above said pot, an electrode mass in said holder adapted to extend down into the pot far enough to enter a bath in such pot, a plurality of rows of vertical contact rods extending up from said electrode mass, a contact bar connected to each such vertical rod, a bus bar construction above said mass by which current is transmitted to said contact bars and a plurality of horizontal iron members running across above said pot and between said bus bar construction and the top of said pot and spaced from the bus bar construction whereby magnetic short-circuiting is provided below the bus bar and an improved electro-magnetic field is obtained whereby the amount of displacement of a metallic bath in the pot is kept low.

5. A structure as specified in claim 4 in which said vertical rods are made of iron and the contact bars at the top of such rods are made of non-magnetic metal.

6. A structure as specified in claim 1 in which the vertical contact rods include a non-magnetic metal portion for connecting the rods with the bus bar.

7. A structure as specified in claim 1 in which each of said iron connection members is connected to the members of the set of vertical iron rods with which it is magnetically coupled by being attached to such rods by releasable clamping means so as to permit said vertical rods to be individually adjusted vertically.

8. An electric furnace including a pot adapted to hold a charge therein, an electrode, a bus bar, means for supporting the bus bar above the level of the pot, vertical contact rods connecting the bus bar with the electrode to supply current from the bus bar to the electrode and a series of substantially horizontal cross members of magnetic metal which extend across the space between the bus bar and the top of the pot but are below and spaced from the bus bar, to shield a charge in the pot from magnetic fields generated in the furnace.

9. A structure as specified in claim 8 in which the electrode is of the continuous self-baking type surrounded by a casing and in which the cross-members are positioned across the casing to bridge from one side to the other whereby the cross-members provide a magnetic shield for a charge in the pot and reinforce the electrode casing.

10. A structure as specified in claim 8 in which each of the said magnetic metal cross members is releasably clamped to a set of vertical contact rods located in a common transverse zone of the furnace.

11. A structure as specified in claim 10 in which the cross-members are clamped to the vertical contact rods and in which the cross-members are connected with the supporting structure for the bus bar whereby the cross-members provide a magnetic shield and assist in supporting the weight of the electrode.

References Cited in the file of this patent

UNITED STATES PATENTS

| 935,796 | Von Kuglgen et al. | Oct. 5, 1909 |

FOREIGN PATENTS

| 1,033,872 | France | Apr. 8, 1953 |
| 84,572 | Norway | Sept. 18, 1954 |

OTHER REFERENCES

Luzatto: "Reflections on the Electrolytic Cells Used in the Production of Aluminum," Transactions AIME, vol. 188, January 1950, Journal of Metals, page 113.